United States Patent [19]

Fennel, Jr. et al.

[11] 4,397,018
[45] Aug. 2, 1983

[54] BATON PASSING METHOD AND APPARATUS FOR MAINTAINING SYNCHRONIZATION IN A TDMA SATELLITE COMMUNICATION SYSTEM

[75] Inventors: John W. Fennel, Jr., Olney; Huo-Bing Yin, Potomac, both of Md.

[73] Assignee: IBM Corporation, Armonk, N.Y.

[21] Appl. No.: 219,142

[22] Filed: Dec. 22, 1980

Related U.S. Application Data

[63] Continuation of Ser. No. 85,555, Oct. 17, 1979.

[51] Int. Cl.$^3$ .................. H04J 3/06; H04B 7/155
[52] U.S. Cl. .................................. 370/104; 370/17
[58] Field of Search ............... 370/104, 13, 17; 375/3; 455/12

[56] References Cited

U.S. PATENT DOCUMENTS 3,761,814  9/1973  Bernasconi et al. ................ 370/104
3,878,339  4/1975  Maillet ................................ 370/104
4,004,225  1/1977  Ganssmantel ...................... 370/104

FOREIGN PATENT DOCUMENTS 2390861  12/1978  France .
1527370  10/1978  United Kingdom .

OTHER PUBLICATIONS

"Burst Synchronization for Domestic TDMA System" by Samejima, *Review of the Electrical Communication Laboratories*, vol. 26, Nos. 1-2, Jan.-Feb. 1978.

"Processing of Bursts in a TDMA System" by Maillet, presented at the London Conference on Digital Satellite Communications, Nov. 1969.

"Some Switching, Signaling and Synchronization Techniques in Satellite Communication Systems" in Telecommunication Journal of Australia, vol. 25, No. 3, 1975, by Even-Chaim, pp. 239-250.

"MAT-1 A 700-Channel Time-Division Multiple Access System . . . " by Schmidt et al., *IEEE International Conference on Communications*, Jun. 9-11, 1969, pp. 15-7 to 15-12.

"E2-Concentration de la Parole et Acces Multiple" by Lombard et al., *Deuxieme Colloque sur les Telecommunications Numeriques par Satellite*, Nov. 28-30, 1972, pp. 324-331.

"Signaling System in the SMAX Satellite Communication System" by Ikeda, *Review of the Electrical Communication Laboratories*, vol. 19, Nos. 5-6, May-Jun. 1971, pp. 594-610.

*Primary Examiner*—Douglas W. Olms
*Attorney, Agent, or Firm*—John E. Hoel

[57] ABSTRACT

In a TDMA satellite communication system, one of the stations is elected the primary station which transmits a reference burst to all other stations to synchronize the local clocks in each station. Each subsidiary station in turn responds by transmitting a local transmit reference burst to enable synchronization of the local transmit clocks. In order to assure that the synchronous operation of the network will continue when the reference station experiences a failure, an alternate reference station is designated in the network which will assume the role of the primary reference station in a baton passing operation in the event that the existing primary reference station must abdicate its reference role. An improved method and apparatus for carrying out the baton passing operation monitors the channel error rate at the reference station and the alternate station. The error rate is measured by detecting FEC from assessing the error syndromes in the reference bursts from the reference station as received at the reference and alternate stations. This refined monitoring technique is combined with the coarser technique of monitoring the number of negative acknowledgement signals from the subsidiary stations indicating that they have not correctly received reference bursts, to yield a more refined determination at the reference station of its effectiveness as a reference station. The alternate station uses a similar technique to determine if it is sufficiently healthy to play the role of alternate station.

18 Claims, 9 Drawing Figures

REFERENCE STATION

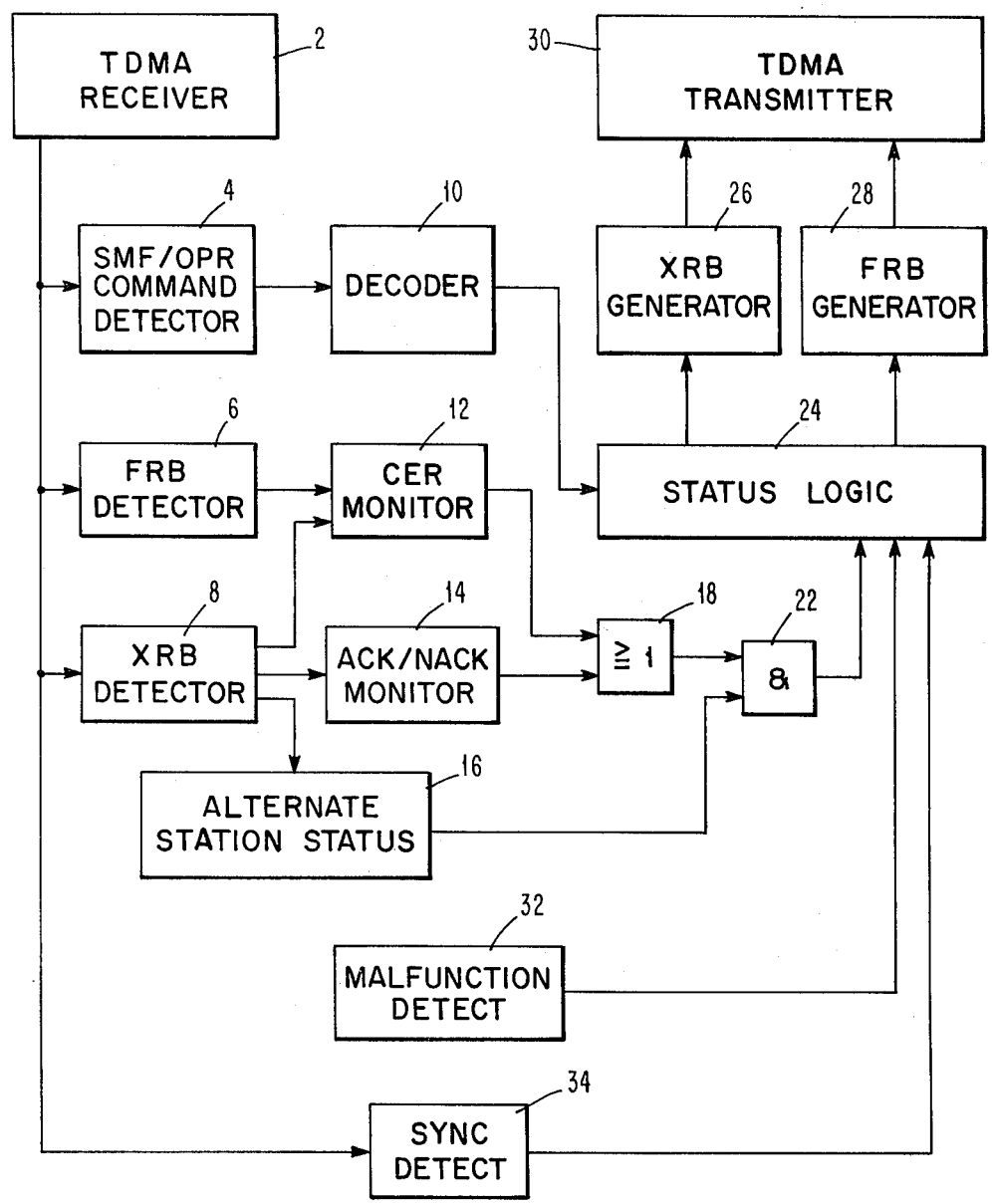
FIG. 3 REFERENCE STATION

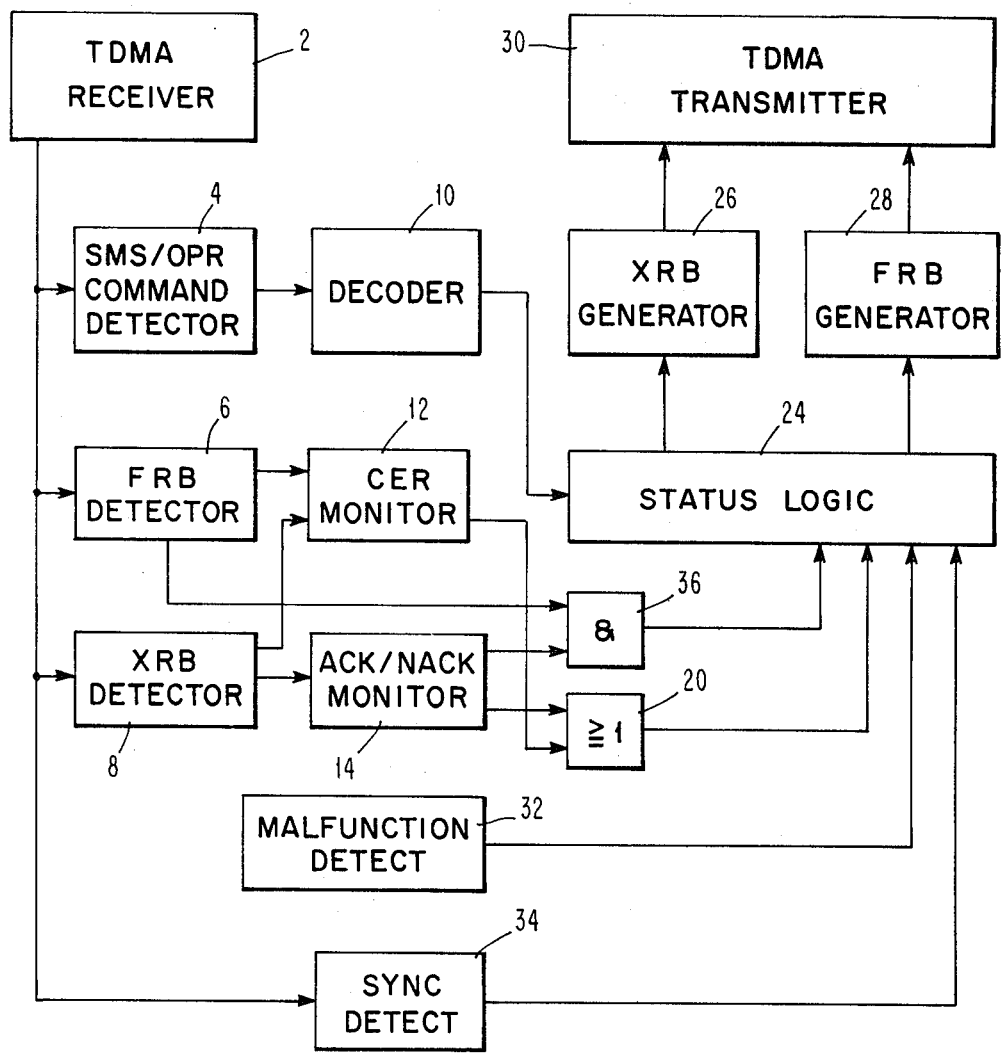
FIG. 4 ALTERNATE (REFERENCE STANDBY) STATION

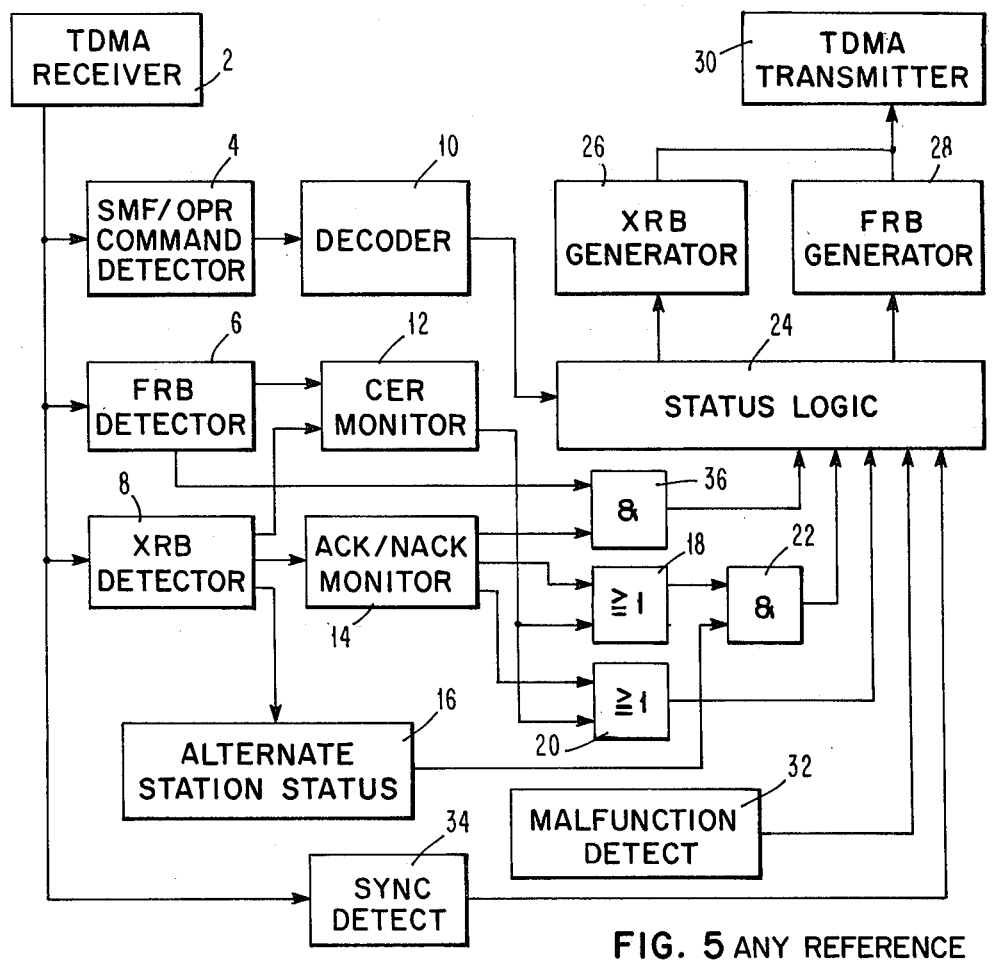
FIG. 5 ANY REFERENCE OR ALTERNATE STATION
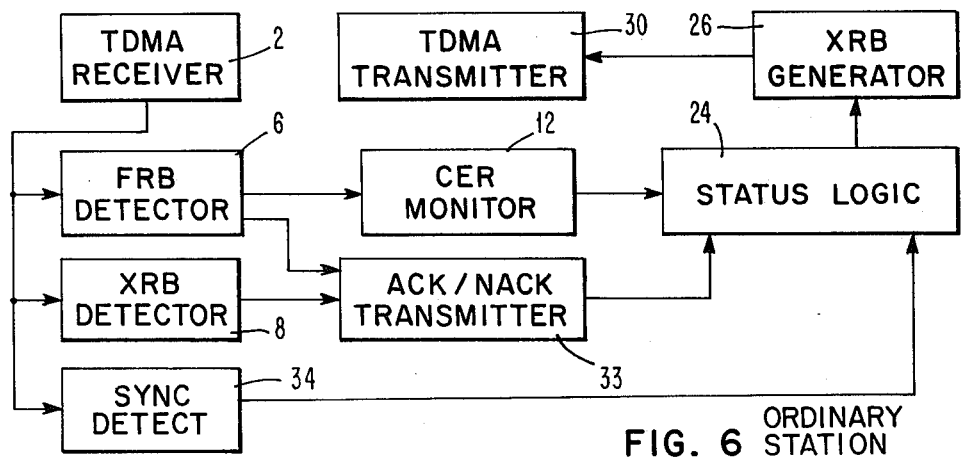
FIG. 6 ORDINARY STATION

BATON PASSING METHOD AND APPARATUS FOR MAINTAINING SYNCHRONIZATION IN A TDMA SATELLITE COMMUNICATION SYSTEM

This is a continuation, of application Ser. No. 85,555 filed Oct. 17, 1979.

FIELD OF THE INVENTION

The invention disclosed broadly relates to TDMA satellite communications and more particularly relates to improvements in baton passing techniques for TDMA satellite communications networks.

BACKGROUND OF THE INVENTION

In a TDMA satellite communication system, one of the stations is elected the primary station which transmits a reference burst, known as the frame reference burst (FRB), to all other stations at the beginning of every transmission frame, to synchronize the local clocks in each station and to transmit station channel assignments and other control information. Each subsidiary station, in turn, responds to the FRB by transmitting a transmit reference burst (XRB) once every superframe, a superframe is 20 frames long, each XRB containing its station's request for additional channel assignments and other control information.

In order to assure that the synchronous operation of the network will continue when the reference station experiences a failure, the prior art has provided an alternate reference station which is designated in the network, and which will assume the role of the primary reference station in the event that the existing primary reference station must abdicate its primary reference role. The operation of transferring control from the primary reference station to the alternate reference station has been called baton passing. Prior art baton passing techniques have employed a relatively coarse criterion of a total absence of acknowledgements from other stations in the network as an indication that they have not received the FRBs from the primary reference station.

However, as TDMA satellite communication systems have become more sophisticated, providing greater function at higher speeds, a more refined baton passing technique is required since the prior art baton passing technique would allow the reference station to meet the prior art criterion for good health and yet still be sending bursts of information having a high channel error rate. Since the reference station also generally serves the function of making channel assignments for all of the subsidiary stations based upon a capacity request in the XRB, it would consequently be assigning the wrong channel allocations if the reference reads the XRB incorrectly which could create chaotic results in the TDMA system.

OBJECTS OF THE INVENTION

It is therefore an object of the invention to provide the more refined baton passing technique for a TDMA satellite communication network.

SUMMARY OF THE INVENTION

This and other objects, features and advantages of the invention are accomplished by the baton passing method and apparatus disclosed herein. In order to increase the reliability of the transmission of control and assignment information in the frame reference burst from the primary reference station and the reception of the transmit reference burst from the alternate and all other subsidiary stations, these bursts are forward error correction coded. The reference station and the alternate station can then monitor the channel error rate for the information contained in the frame reference burst and transmit reference burst by assessing the number of bursts which are received containing errors revealed by their forward error correction coding. This is a refinement over the prior art technique of merely detecting the gross lack of an acknowledgement from the subsidiary stations that they have received the frame reference burst or the transmit reference burst from the alternate station. If the reference station is exposed to a high channel error rate, the reference station will receive transmit reference bursts from the subsidiary stations containing many errors. Since these transmit reference bursts contain demands for channel assignments, the reference station would assign wrong channel allocations, a situation which would not immediately be detected with the grosser prior art techniques. If the alternate reference station is exposed to a high channel error rate, the alternate cannot perform effectively as a primary reference station in the event that the primary was experiencing a relatively high channel error rate. The method and apparatus disclosed herein minimize this problem by providing that where the alternate reference station cannot assume the responsibilities of the primary reference station, it will stop functioning as the alternate. The reference, detecting no alternate, will appoint another alternate.

DESCRIPTION OF THE FIGURES

FIG. 3 is a block diagram, for the reference station, of a preferred embodiment of the present invention.

FIG. 4 is a block diagram, for the alternate (reference standby) station, of a preferred embodiment of the present invention.

FIG. 5 is a block diagram, for all stations in a reference and alternate station group, of a preferred embodiment of the present invention.

FIG. 6 illustrates a block diagram of a normal ground station.

DISCUSSION OF THE PREFERRED EMBODIMENT

In a TDMA satellite communication system, synchronization is provided by a reference station. The baton passing operation is a necessity in the event of reference station failure, malfunction or exposure to high channel error environment. The baton pass allows the alternate station (reference standby) to take over the reference role.

There can be a number of stations having accurate and stable clocks and these are designated as the reference and alternate group. Only those stations in this group can become the reference or alternate station.

Figure 1:
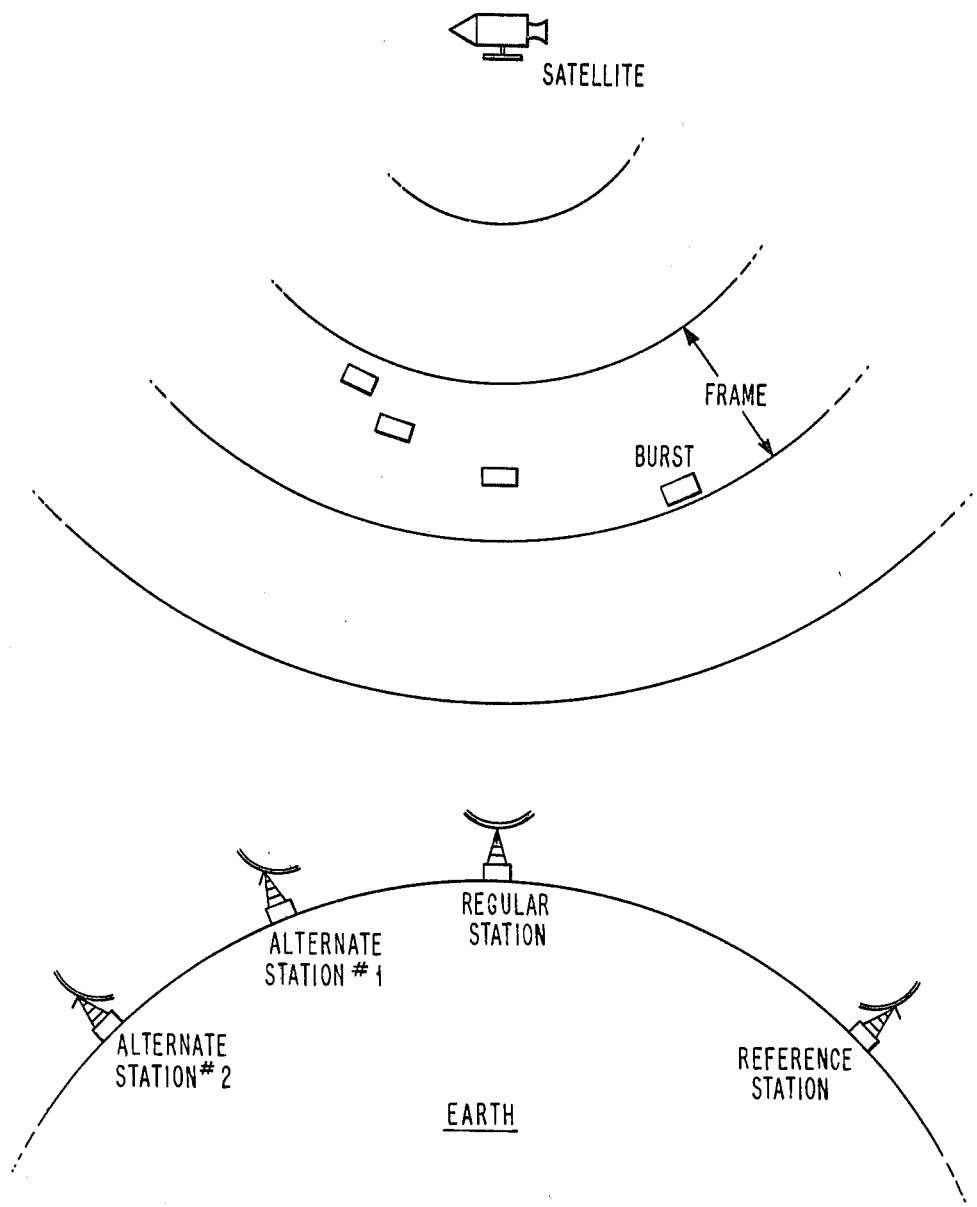
FIG. 1 illustrates a TDMA satellite configuration.

FIG. 1 illustrates a typical TDMA satellite communications configuration. Every ground station transmits its burst in the appropriate time slot within a time frame using synchronization information from the reference station to insure that there is no overlap of signal bursts received at the satellite.

Figure 2:
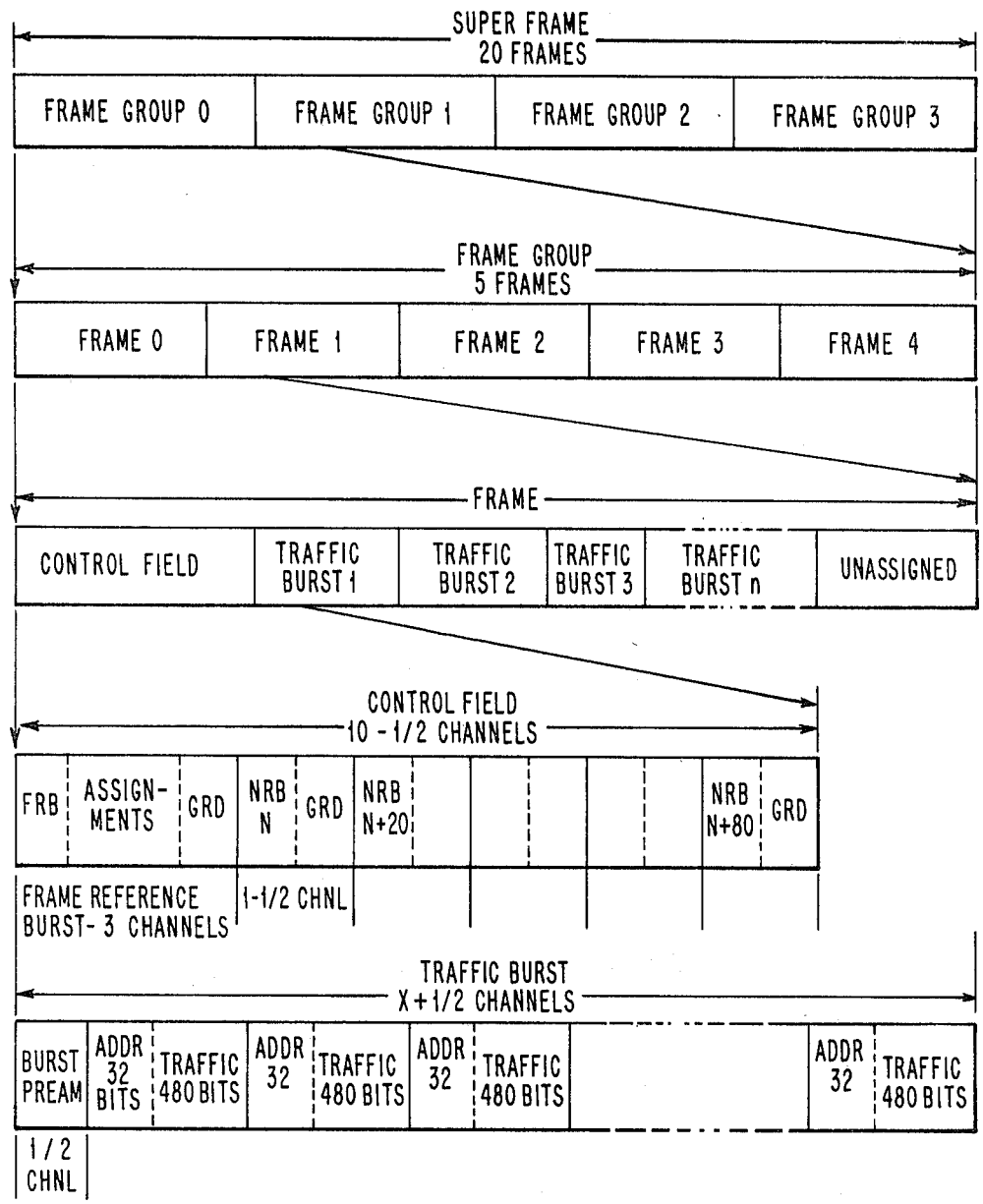
FIG. 2 shows the frame, frame group, and superframe format including control field and traffic field for a TDMA satellite communication system.

FIG. 2 shows the superframe format. Each frame contains bursts from the reference station and bursts from each of the subscribing stations in a transponder net. The reference station broadcasts the frame reference burst (FRB) once every frame. The FRB consists of a preamble including a unique word, carrier recovery and clock recovery information, frame ID, time of the day, delay deviation, assignment field and an undefined field, and is transmitted at the beginning of the frame to provide frame/superframe synchronization and channel allocation messages to all ground stations. Within the control field there are transmit reference bursts (XRB) emitted at the appropriate time slot once per superframe by every ground station. Each ground station utilizes its XRB to sustain transmit clock synchronization, to transmit certain status information including acknowledgements of FRB reception from the reference station and XRB reception from the alternate station, and to transmit demand requests for transponder capacity. Thus control communication between the reference station, alternate station and other stations in a transponder net is established via the FRB an XRB. It is important to maintain the FRB and the reference station duties/functions in case of the reference station's failure, malfunction or exposure to severe atmospheric disturbances.

FIG. 3 depicts the baton passing apparatus of this invention at the reference ground station. The reference station broadcasts the FRB, generated by FRB generator 28, once per frame via the TDMA transmitter 30 and transmits its XRB once per superframe from the XRB generator 26. The TDMA receiver 2 receives this information and directs it to FRB detector 6 and XRB detector 8, respectively. The XRB detector receives all the XRBs in the transponder net.

Since the FRB and XRB play a vital role in the TDMA satellite communication system, they are required to have a highly reliable transmission. The messages in the FRB and XRB are protected by using a forward error correction code (FEC) and a cyclic redundancy check (CRC). The FRB's reliability is further enhanced by repetitive transmission; four times in a superframe, as illustrated in FIG. 2. Hence a reliable FRB can still be maintained even at a CER of (channel error rate) = $10^{-2}$. However status information and demand requests in the XRB from all stations are not as well protected as the FRB and the probability of decoding errors could be higher than that of the assignments contained in the (FRB). If the reference station is exposed to high CER, the reference station can still transmit its FRB reliably to all ground stations but will receive XRBs from all ground stations with some errors. Consequently the reference station can assign channel allocations based upon erroneous information.

The FRB is detected by the FRB detector 6 and its own station health is analyzed by the CER monitor 12. The CER can be measured by counting non-zero syndromes of the forward error correction code of the assignments in the FRB. The XRB acknowledgements are monitored by the FRB detector 8 and the negative acknowledgements are counted by the ACK/NACK monitor 14. If either the output of the CER monitor 8 or the output of the ACK/NACK monitor 14 is larger than a predetermined threshold value, the output of the "OR" gate 18 goes active.

The reference station also determines the health of the alternate station from the XRBs received from all stations. If the alternate station is healthy (CER $< 10^{-4}$), the output of the alternate station status logic 16 is active. If both inputs to the "AND" gate 22 are active, the output of the "AND" gate 22 activates the status logic 24 to inhibit the FRB generator 28, thus the reference station stops broadcasting the FRB and relinquishes its reference role. The reference station is further provided with internal diagnostic programs so that the devices are periodically checked for malfunction. If malfunction is detected by the internal malfunction device 32, its output activates the status logic 24 to inhibit the FRB generator 28 and force the reference station to abdicate its role as the primary reference station. The system is further provided with a synchronization detector 34 to monitor the transmit and receive synchronization on a superframe and frame basis respectively. Once the station detects a non-synchronizing condition, whether it is derived from the receive or transmit portion of the equipment, the output of the synchronization detector activates the status logic 24 to inhibit the FRB generator 28. Thus no FRB will be transmitted and the reference station relinquishes its role. The system can also accept a command from system management facility (SMF) or operator via the route through the SMF/operator command message detector 4 and decoder 10, to deactivate or invoke the FRB generator 28.

Refer to FIG. 4 for the alternate reference station's baton passing apparatus. The majority of the implementation is in FIG. 4 is identical to that of the reference station as shown in FIG. 3 except for the following differences. The FRB generator 28 is inhibited by the status logic 24 until it is invoked when the alternate becomes the primary reference station. The conditions for the alternate station to assume the primary reference role are the failure to receive an FRB $(\overline{FRB})$, as detected by the FRB detector 6 in FIG. 4 and the reception of XRBs from other ground stations indicating that the number of NACKs for the reference station's FRB exceeds the threshold level. The "AND" gate 36 is thus activated and alarms the status logic 24 to invoke the FRB generator 28 of FIG. 4. As an alternate station, its own health is continuously monitored by the CER monitor 12 and it also detects acknowledgements from all ground stations in the transponder net from the ACK/NACK monitor 14 to make sure that its own XRB is well received by other ground stations. If the number of NACKs on its own XRB exceeds a fixed threshold value or if its CER exceeds its predetermined threshold level, the "OR" gate 20 becomes active and alarms the status logic 24. A message is put into its XRB which notifies all stations in the transponder net that the alternate station has abdicated its alternate station role. Upon receipt of this message the reference station appoints a new alternate station from a table in the alternate station status block 16 which stores a list of the stations in the reference and alternate group along with their corresponding operational status, so that the new alternate station will be ready to take over the primary reference role in the event that baton passing functions become needed. Other functions, such as internal malfunction detection 32 and synchronization detection 34 are identical to that of FIG. 3. Any symptom of a problem shown either by the malfunction detector 32 or the synchronization detector 34 causes the alternate station to relinquish its alternate role. Furthermore the alternate station can be commanded either by the SMF or an operator to abdicate its alternate role.

If the abdication of the reference or alternate role and the assumption of the reference role by the alternate station follows the above rules, simultaneous FRB transmission from the reference and alternate station is extremely unlikely.

Since the reference and alternate stations can play either role, the implementation must be identical. FIG. 5 illustrates the implementation including both reference and alternate station functions. When the station acts as the reference station, the functions as shown in FIG. 3 will follow. When the station acts as an alternate station, the functions as shown in FIG. 4 will follow.

Suppose some stations experience reference station FRB failure briefly in the middle of the superframe, caused perhaps, by an airplane passing through the beam width of the reference station. As a consequence, some stations may not receive the FRB information. The number of NACKs sent out by stations, which are received at the reference and alternate stations may exceed the predetermined threshold level at the reference two superframes later (due to round trip delay) and this could cause the reference station to abdicate. Initially, the number of NACKs seen by the alternate may not be enough to cause it to become referenced. However, after reference abdication, the number of NACKs is very large (probably the complete set of normal stations). This large number of NACKs, and no FRB causes the alternate to assume the reference role.

The situation of a passing airplane could happen at any station. When it occurs at a subscribed station, the increase in number of NACKs is minimal (one) and this will not exceed the threshold settings at the reference station or alternate station. When such interference occurs at the alternate station, all stations could receive no XRB from the alternate station. Again, this happens only temporarily and thus normal reception of the XRB (from the alternate station) resumes one superframe later. No detrimental effects result from this momentary interruption.

The channel error rate (CER) threshold criteria require that the reference and alternate stations should have lower CER requirements, i.e., $CER < 10^{-4}$ in order to perform their roles with the necessary accuracy. However, the CER of other subscribed stations in the network can degrade down to $10^{-2}$ and they can still maintain usable voice communication.

Acknowledgement by any station of the reception of FRBs or XRBs from the reference or alternate station, respectively, is transmitted by the ACK/NACK transmitter 33 in the receiving station of FIG. 6 via two bits in one of the bytes of its XRB representing the status of the reference and alternate station, as seen by that ground station. If there are a large number of NACKs which appear, this would mean that the reference station is not functioning effectively and its role as the primary reference station should be relinquished.

Similarly if the alternate station observes a large number of NACKs of its XRBs, the alternate station should relinquish its role as the alternate. Then the reference station will appoint a new alternate station which is healthy, i.e. $CER < 10^{-4}$. This provides a preventative measure against the alternate station taking over the reference's role when the alternate is not in a condition to do so.

A threshold which identifies how many NACKs are allowed must be set for the alternate station to take the reference role. Likewise a threshold for the reference or alternate abdication must also be established. The established thresholds are based upon a fixed probability so that this criterion applies equally well for a network having a large number of stations or small number of stations. The NACK threshold requirements, thus established are shown in Table 1 and Table 2.

TABLE 1

Number of FRB NACKs (Negative Acknowledgements) Must be Received by Alternate Station for Taking Over the Reference Role versus Number of Stations in a Network

| No. of Stations | No. of NACKs |
|---|---|
| 10 | 7 |
| 20 | 16 |
| 30 | 26 |
| 40 | 35 |
| 50 | 45 |
| 60 | 54 |
| 70 | 64 |
| 80 | 74 |
| 100 | 94 |

TABLE 2

No. of FRB NACKs or No. of XRB NACKs Must be Received by the Reference Station or Alternate Station Respectively to Relinquish Their Respective Role versus No. of Stations in a Network.

| No. of Stations | No. of NACKs |
|---|---|
| 10 | 3 |
| 20 | 4 |
| 30 | 4 |
| 40 | 5 |
| 50 | 5 |
| 60 | 6 |
| 70 | 6 |
| 80 | 6 |
| 100 | 6 |

A typical ground station as shown in FIG. 6 is also provided with FRB detector 6 and CER monitor 12, malfunction detector 32 and synchronization detector 34. The detection of a failure in any one of these functions, such as when the station experiences severe atmospheric disturbances (large CER), a malfunction or a loss of synchronization, can alarm the status logic 24 which will inhibit transmission to assure the TDMA system's integrity.

As mentioned before, the CER requirements for the alternate and reference station should be lower than those of normal subscribed stations in order to maintain proper and efficient system operation. Suppose that the reference station is experiencing a degradation of the channel environment. Once it determines that CER is larger than $10^{-4}$, the reference station should stop its FRB transmission. Then, the alternate station at first will receive no FRB and this will be followed by the reception of a large number of NACKs (indicating no FRB) from all stations. The alternate station will then take over the reference station's duties and will become the new primary reference station of the transponder net. Furthermore the new reference station will appoint a new alternate station from the reference/alternate groups.

Although the old reference station has relinquished its duties as a reference, it can still remain operating as one of the regular stations since communication links can be maintained up to $CER < 10^{-2}$. Likewise the alternate station can become one of the regular stations when exposed to $10^{-2} > CER > 10^{-4}$.

It may be desirable to define any station as nonhealthy if $CER > 10^{-2}$. Such stations should be retired from the active role of transmitting XRBs and data. (Incoming calls can be blocked.) However the station should keep its passive mode in operation to continuously monitor FRBs. Once it determines that its health has been recovered, the station should re-enter the network. The definition of nonhealthy station includes those stations experiencing malfunctions. A malfunction can prevent any station from monitoring FRBs until it has been repaired.

Figure 7:
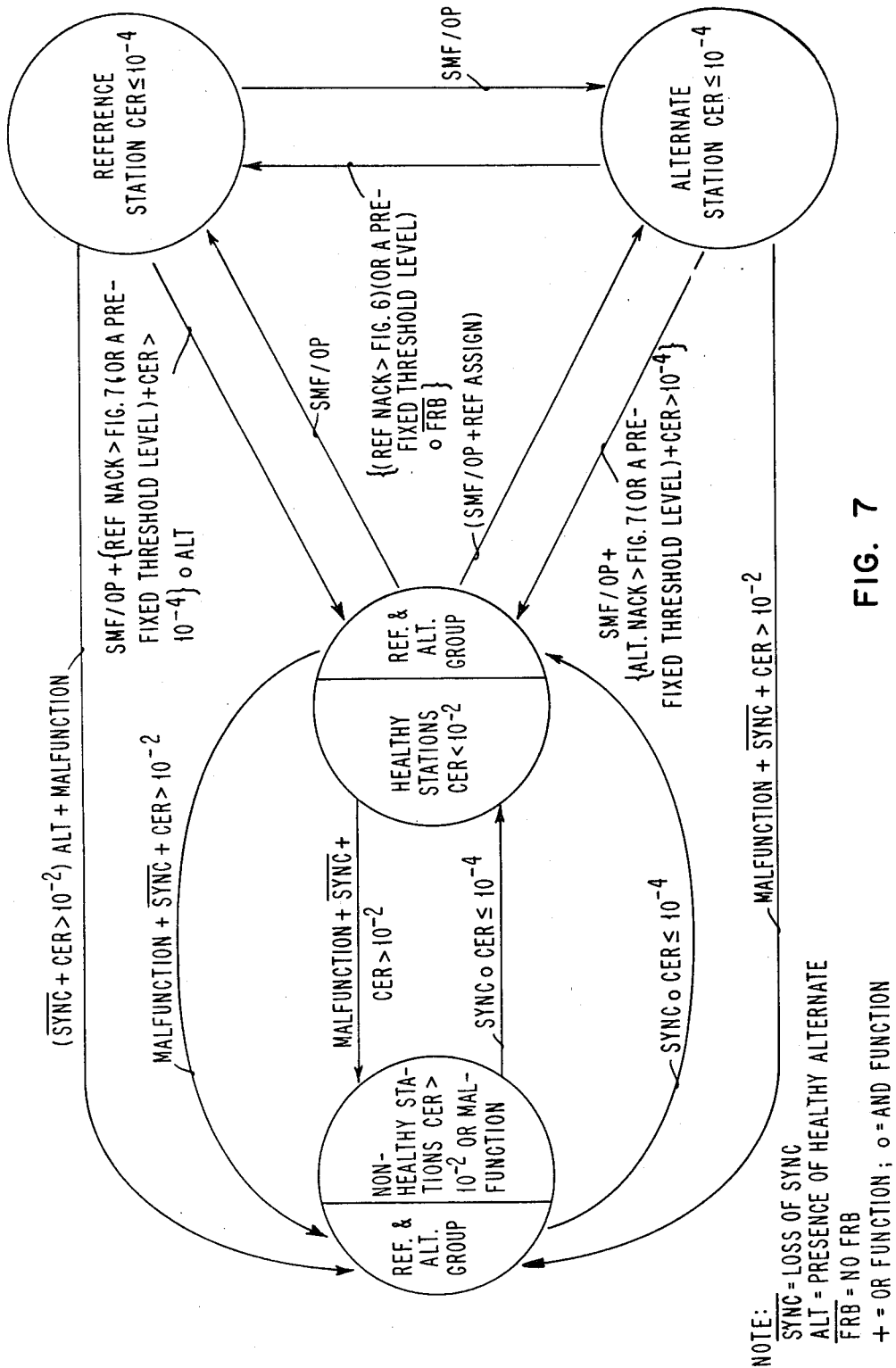
FIG. 7 is a state diagram, which summarizes all baton passing functions, of a preferred embodiment of the present invention.

The baton passing functions described can be summarized in the state diagram shown in FIG. 7.

There are a total of four states for a given station; the healthy stations (with a reference/alternate group) ($10^{-2} > CER$), the alternate station ($CER < 10^{-4}$), the reference station ($CER < 10^{-4}$) and nonhealthy stations ($10^{-2} < CER$). The rules with each path denote the required conditions for changing states.

(1) One of the stations from the reference and alternate group station becomes reference station.
   Rule: SMF/OP, Command either from SMF (system management facility) OR operator, AND station $CER < 10^{-4}$.

(2) Reference station becomes alternate station.
   Rule: SMF/OP, command either from SMF OR operator AND $CER < 10^{-4}$.

(3) Alternate station returns to the reference and alternate group.
   Rule: SMF/OP+ALT. NACK>Table 2 (or a preset threshold level)+$CER > 10^{-4}$.
   The alternate station relinquishes its alternate role if and only if
   1. Command either from SMF or operator, OR
   2. Alternate receives a number of NACKs of its XRB greater than those established in Table 2 (or a preset threshold level), OR
   3. Alternate experiences $CER > 10^{-4}$.

(4) Alternate station is appointed from the reference and alternate group.
   Rule: SMF/OP+Ref. Assign.
   Any station having $CER < 10^{-4}$ in the reference and alternate group can become an alternate if and only if
   1. Command either by SMF or operator, OR
   2. Assigned or appointed by the reference station.

(5) Alternate station becomes reference station.
   Rule: $\overline{FRB}$ o [Ref. NACK>Table 1 (or a preset threshold level)].
   Alternate can become a reference if and only if the alternate station observes
   -1. No FRB is present, AND
   2. Reference NACKs are greater than those shown in Table 1 (or a preset threshold level) for a number of superframes.

(6) Reference station goes back to the reference and alternate group.
   Rule: SMF/OP+[Ref. NACK>Table 2 (or a preset threshold level)+$CER > 10^{-4}$] o ALT
   The reference station returns to the reference and alternate group if and only if
   1. Command either from SMF or operator, OR
   2. Reference station receives a number of NACKs greater than those shown in Table 2 (or a preset threshold level), or $CER > 10^{-4}$ AND the presence of a healthy alternate station. If there is no healthy alternate station existing at that moment, an alternate station must be assigned before the reference station abdicates.

(7) Reference station becomes nonhealthy.
   Rule: $(\overline{SYNC} + CER > 10^{-2})$ o ALT+Malfunction
   The reference station becomes nonhealthy and returns to the nonhealthy reference and alternate group if the following conditions occur.
   1. Reference station experiences malfunction, OR
   2. Reference station has lost receive synchronization OR exposed to a high CER ($CER > 10^{-2}$) AND the presence of a healthy alternate station. If there is no healthy alternate station existing at that moment, an alternate station must be assigned before the reference station abdicates.

(8) Stations in the nonhealthy reference and alternate group become healthy.
   Rule: SYNC o $CER < 10^{-4}$
   The nonhealthy station in the reference and alternate group becomes healthy if the following conditions are met
   1. CER is less than or equal to $10^{-4}$, AND
   2. Synchronization has been established.

(9) Alternate station becomes nonhealthy.
   Rule: Malfunction+$CER > 10^{-2}$+$\overline{SYNC}$
   The alternate station becomes nonhealthy and retires to the nonhealthy reference and alternate group if the conditions exist
   1. Malfunction occurs, OR
   2. The alternate station experiences $CER > 10^{-2}$, OR
   3. The alternate station is unable to acquire either transmit OR receive synchronization.

(10&11) Healthy station (either from the reference and alternate group or normal subscribed ground stations) becomes nonhealthy.
   Rule: Malfunction+$CER > 10^{-2}$+$\overline{SYNC}$
   The conditions are similar to that of the above rule 9.

(12) Nonhealthy station becomes healthy.
   Rule: SYNC o $CER < 10^{-4}$
   These are identical conditions as explained in the rule 8.

By the use of this implementation for transfer of the reference station duties to an alternate station (standby reference station) or vice versa, system integrity is maintained. Moreover the baton passing technique is automatic and adaptive to environmental changes such that it prevents the loss of system synchronization in the TDMA configuration. Flexibility is provided since the automatic procedure can be overridden either by SMF command or operator command. Accordingly, it is possible to obtain baton passing operations having excellent performance qualities.

DETAILED DESCRIPTION OF THE OPERATION

Since the satellite link exhibits long round trip delay characteristics, there is a substantial delay between the transmission of the FRB and the reception of corresponding ACK, NACK, contained in the XRBs. The baton passing scheme should be crisp and the time involved in the completion of duty transfer should be less than 3 seconds. Otherwise the system cannot sustain synchronization during the outage of FRBs and will drift out of synchronization.

Figure 8A:
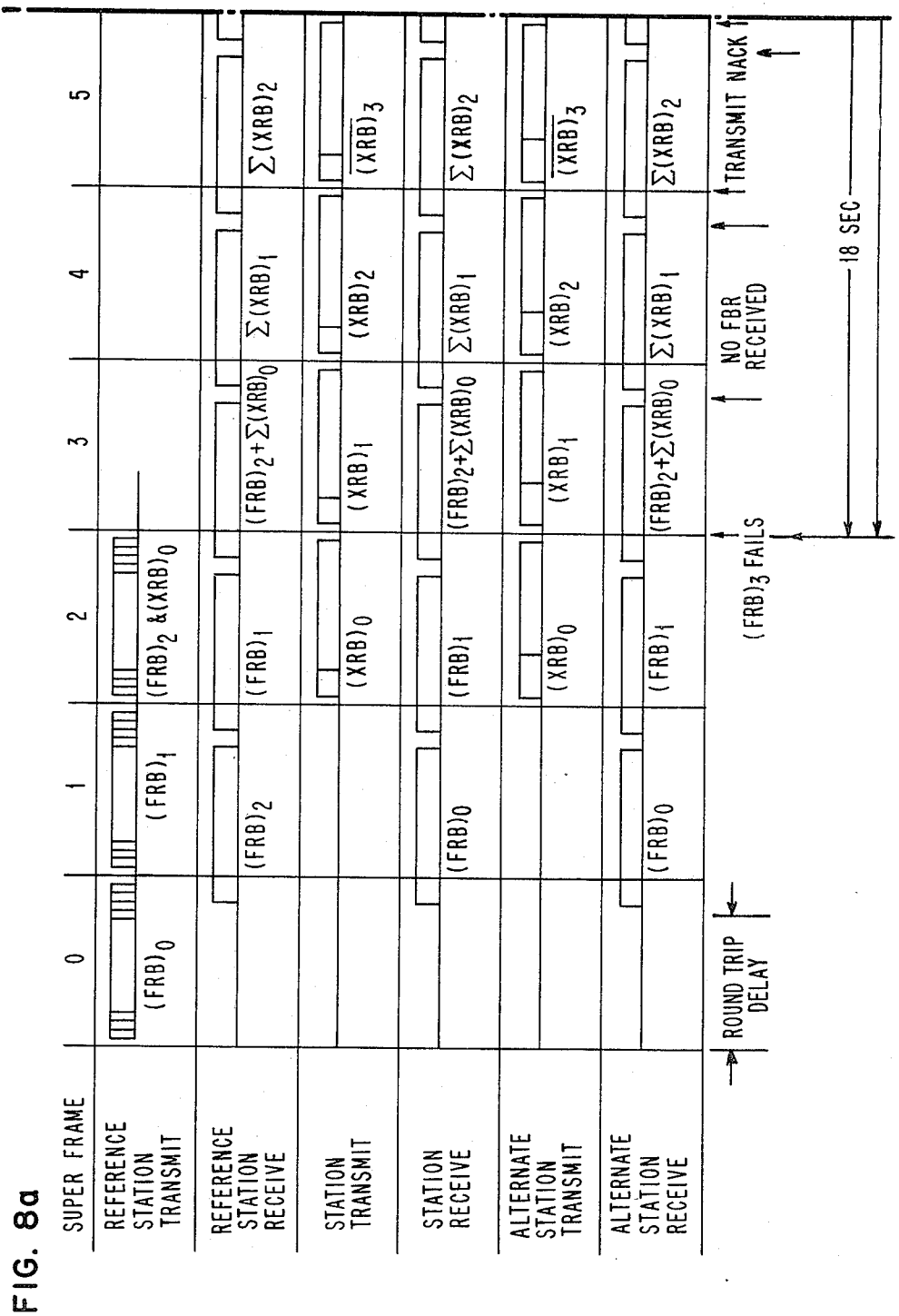
FIGS. 8a and 8b illustrate a timing diagram for the baton passing operation.
Figure 8B:
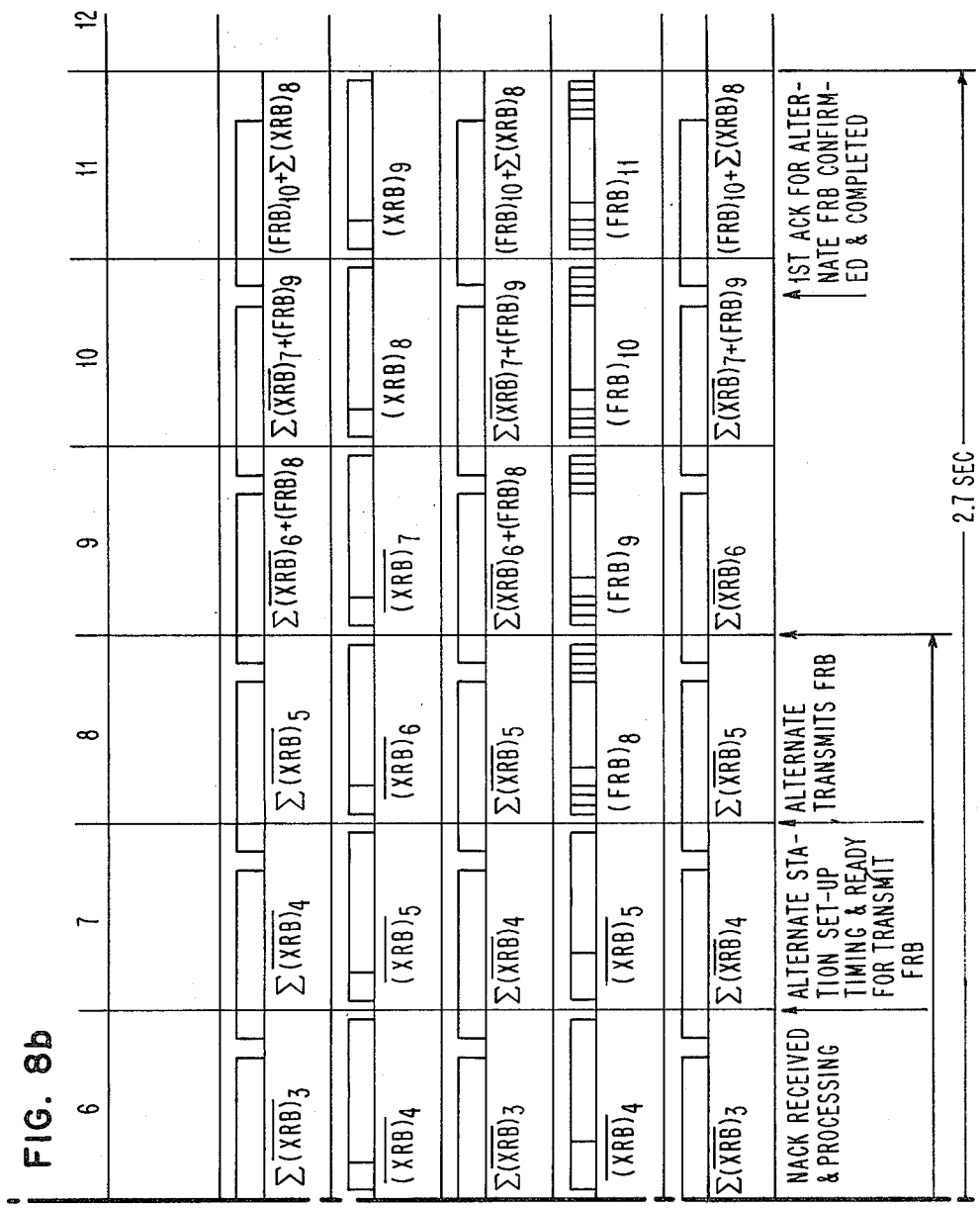

An illustration of the elapsed time between transmission of FRB and reception of XRB at the reference station is depicted in FIG. 8. At the superframe "0," the reference station transmits an FRB per frame or FRBs 20 times per superframe (300 msec) denoted as (FRB). All stations (including the reference station) in a transponder network begin to receive the (FRB) about 250 msec (average round trip delay) later. Completion of assignment reception extends into the superframe "1." Every station is assigned an appropriate time slot for transmission. All stations after processing of received FRB, send back ACKs or NACKs to the reference station during the superframe "2." Completion of receiving and processing all XRBs ((XRB)$_0$ in FIG. 8) at the reference station lasts almost until the end of the superframe "3." During this time, the alternate station performs the same task as performed by the reference station so that the alternate station knows the ACK or NACK count. It takes four superframe times or 1.2 seconds for the reference station to exercise FRB transmission and reception of ACKs or NACKs.

Notice that although FRB and acknowledging XRB are coexisting every superframe, the XRB represents the ACK or NACK for a previous FRB. For example, the bursts in the control field of the nth superframe are (FRB)$_n$ and (XRB)$_{n-2}$. (XRB)$_{n-2}$ represents the ACKs or NACKs from all stations responding to the FRB of the (n−2)th superframe.

Similarly the alternate station will experience the identical delay as the reference station between its XRB transmission and reception of ACKs from all stations.

Time required and sequence of events during duty transfer can be observed from the following illustration.

Refer to FIG. 8 and suppose the reference station fails abruptly at the beginning of the superframe "3." The chain of events is demonstrated as follows:

| Superframe No. | | Events |
|---|---|---|
| 3. | a. | Reference station stops transmission of FRB (suffers hardware/software failure). |
| | b. | Alternate and other stations transmit ACKs which respond to the FRB of the superframe "1" as (XRB)$_1$s. |
| | c. | All receivers (reference, alternate and others inclusive) complete receiving and processing (FRB)$_2$ and (XRB)$_0$s. |
| | d. | All receivers start to receive (XRB)$_1$s. |
| 4 | a. | No transmission of FRB and XRB from reference. |
| | b. | Alternate and other stations transmit ACKs which respond to the FRB of the superframe "2" as (XRB)$_2$s. |
| | c. | All receivers complete receiving and processing (XRB)$_1$s and detect no FRB. |
| | d. | All receivers start to receive (XRB)$_2$s. |
| 5 | a. | No transmission of FRB and XRB from reference. |
| | b. | Alternate and other stations transmit NACKs, $\overline{(XRB)}_3$ which mean no FRB detection during superframe "3." |
| | c. | Receivers complete receiving and processing $\overline{(XRB)}_2$s and detect no FRB. |
| | d. | Receivers start to detect NACKs. |
| 6 | a. | No transmission of FRB and XRB from reference. |
| | b. | Alternate and other stations transmit NACKs in response to no FRB received during superframe "4." |
| | c. | Receivers complete receiving and processing of $\overline{(XRB)}_3$s and detect no FRB. Alternate station sees NACKs which are larger than predetermined threshold and prepares to take over the reference role. |
| | d. | Receivers start to detect $\overline{(XRB)}_4$. |
| 7 | a. | No transmission of FRB and XRB from reference. |
| | b. | Alternate and other stations transmit NACKs in response to no FRB during the superframe "5." |
| | c. | Receivers complete receiving and processing of $\overline{(XRB)}_4$s and detect no FRB. |
| | d. | Receivers start to detect $\overline{(XRB)}_5$s. |
| | e. | Alternate station is ready to transmit FRB. |
| 8 | a. | Alternate station transmits (FRB)$_8$. |
| | b. | Other stations transmit NACKs in response to no FRB during superframe "6." |
| | c. | Receivers complete receiving and processing of (XRB)$_5$s and detect no FRB. |
| | d. | Receivers start to detect (FRB)$_8$ and $\overline{(XRB)}_6$s. |

The process keeps going on and the alternate receives ACKs for (FRB)$_8$ (1st FRB from alternate station), confirmed and completed, at the end of the 11th superframe. It is indicated in the bottom of FIG. 8 that the baton passing from the failure of the reference station to the resumption of FRB transmission at the alternate station takes 1.8 seconds and it takes a total of 2.7 seconds from the reference failure to the restoration of FRB and confirmation of its receipt by the other stations.

DETERMINING CHANNEL ERROR RATE (CER)

The satellite link is assumed to be a binary symmetric channel. Significant error improvement can be achieved with random error correcting code. The FEC code, used in FRB and XRB is a block code, Quadratic Residue (17, 9) shortened to (16, 8) which provides a maximum of two error corrections. The resultant code rate is ½. The selection of this code is based upon the simplicity of implementation and its attractive performance relative to other codes. A table look-up technique is used for the decoding function.

Every assignment, status information, demand request or CRC requires two blocks of such coded words. The performance of this code at various CERs is tabulated in Table 3. The decoding error probabilities of a complete set of FRB and XRB can thus be evaluated.

TABLE 3

Performance of QR (17, 9) FEC Code, Shortened to (16, 8)
Prob. of Decoding Error

| CER | Per Block | Per Ass., Status Info. Demand Requirements or CRC |
|---|---|---|
| $10^{-4}$ | $5.6 \times 10^{-10}$ | $1.12 \times 10^{-9}$ |
| $10^{-3}$ | $5.53 \times 10^{-7}$ | $1.11 \times 10^{-6}$ |
| $10^{-2}$ | $4.9 \times 10^{-4}$ | $9.8 \times 10^{-4}$ |

Code Rate ½
Max. No. of Corrections 2

Channel error rate (CER) can be determined by measurements of
(A) FRB,
(B) XRB, or
(C) Combination of XRB & FRB.

It has been determined that (1) measurement utilizing CRC errors may not yield accurate results, (2) the FRB measurement is superior since it depends only upon the reference station and is independent of number of stations in a transponder network, and (3) using the FRB offers advantages of a fixed length message per frame, and the number of bits per frame is large. Thus the method of determining CER is based on counting error blocks of the FEC'ed FRBs.

There are a total of 137 syndromes representing 0, 1, and 2-bit errors. The decoding scheme uses a table look-up method corresponding to these syndromes. From the syndrome one can determine whether 1-bit or 2-bit error has occurred.

The probabilities of no error P(0), 1-bit error P(1) and 2-bit error P(2) observed in the received coded messages via the satellite link with CER can be calculated from the frequency function or binominal distribution, $$P(j) = (j^{16})(CER)^j(1-CER)^{16-j} \quad (1)$$

where j=0, 1, ... or 16.

The probability of decoding an error per FEC block ($P_{de}$) is the sum of P(j) where j=3 ... 16, or $$P_{de} = \sum_{j=3}^{16} (j^{16})(CER)^j(1-CER)^{16-j} \quad (2)$$

$$= 1 - P(0) + P(1) + P(2)$$

The probabilities of possible outcomes (j=0, 1, ... 16 errors) have been calculated and are summarized in Table 4 for various channel environments.

TABLE 4

Probability of 0,1,2, ... 16-Bit Error in a 16-Bit Coded Message vs. CER

| | CER | | | | | |
|---|---|---|---|---|---|---|
| P(j) | $10^{-6}$ | $10^{-5}$ | $10^{-4}$ | $10^{-3}$ | $10^{-2}$ | $10^{-1}$ |
| P(0) | 0.999 | 0.999 | 0.998 | 0.984 | 0.851 | 0.185 |
| P(1) | $1.599 \times 10^{-5}$ | $1.599 \times 10^{-4}$ | $1.597 \times 10^{-3}$ | $1.576 \times 10^{-2}$ | $1.376 \times 10^{-1}$ | 0.329 |
| P(2) | $1.999 \times 10^{-10}$ | $1.199 \times 10^{-8}$ | $1.198 \times 10^{-6}$ | $1.183 \times 10^{-4}$ | $1.042 \times 10^{-2}$ | 0.274 |
| $\sum_{3}^{16} P(j)$ | $5.599 \times 10^{-16}$ | $5.599 \times 10^{-13}$ | $5.594 \times 10^{-10}$ | $5.545 \times 10^{-7}$ | $5.079 \times 10^{-4}$ | 0.210 |

Notice that:
When CER < $10^{-4}$, j=0 (no error) constitutes the majority outcomes and others are less than 0.16%. Within this 0.16%, the 1-bit error (j=1) is dominant.

In the range of $10^{-3}$ < CER < $10^{-2}$, the 2-bit error (j=2) is coming into play and contributes some errors.

When CER > $10^{-2}$, $$P(3) \ldots \text{or} \sum_{j=3}^{16} P(j)$$

becomes larger.
For CER < $10^{-3}$, it can be written $$\begin{aligned}P(1) &\cong 1.6 \, (CER) \times 10 \\ P(2) &\cong 1.2 \, (CER)^2 \times 10^2\end{aligned} \quad (3)$$

$$\sum_{j=3}^{16} P(j) \cong 5.6 \, (CER)^3 \times 10^2$$

In the region of interest, CER < $10^{-2}$, P(1) and P(2) are substantially larger than those given by $$\sum_{j=3}^{16} P(j).$$

Then $$P(1) + P(2) + \sum_{j=3}^{16} P(j) \cong P(1) + P(2) \quad (4)$$

Therefore, by counting only the incidence of one and two-bit errors, the CER in the region of interest can be accurately approximated. Table 5 shows the total expected number of 1-bit and 2-bit errors versus the number of superframes and the 95% confidence intervals as a function of CER. The error count is obtained from the non-zero decoding syndrome. By accumulating these counts and comparing to the Table 2, the CER is determined. The counting interval should be long enough so that flutters of CER, such as an airplane passing through the link, etc. are ignored. The counting period, such as 200 or 400 superframes, is reasonable.

TABLE 5

No. of 1-Bit Errors Plus No. of 2-Bit Errors
Versus
No. of Superframes Including 95% Confidence Intervals

| No. of Superframes | Total No. of 16-Bit Coded Words | CER $10^{-6}$ | $10^{-5}$ | $10^{-4}$ | $10^{-3}$ | $10^{-2}$ | $10^{-1}$ |
|---|---|---|---|---|---|---|---|
| 50 | $6 \times 10^4$ | 1 | $10 \pm 6$ | $105 \pm 20$ | $1048 \pm 63$ | $9770 \pm 193$ | $39860 \pm 391$ |
| 100 | $1 \times 10^5$ | 2 | $21 \pm 9$ | $211 \pm 28$ | $2096 \pm 89$ | $19540 \pm 274$ | $79721 \pm 553$ |
| 200 | $2 \times 10^5$ | $4 \pm 1$ | $42 \pm 12$ | $422 \pm 40$ | $4192 \pm 126$ | $39081 \pm 387$ | $159442 \pm 782$ |
| 400 | $5 \times 10^5$ | $8 \pm 5$ | $84 \pm 18$ | $844 \pm 56$ | $8384 \pm 179$ | $78162 \pm 548$ | $318884 \pm 1106$ |

In a satellite link, usually the down link is power limited. When the reference station broadcasts its FRBs, every station can count FEC errors to determine its own CER. The reference station is also able to determine its own CER by observing its looped back FRBs. This method is rather unique as it is an open loop method. The receiving station does not compare message sent to message received. Secondly it utilizes the FEC error syndromes to determine the error environments. The method samples the FEC coded messages during only a small portion of the frame. Since errors in the satellite link can be represented by a Gaussian random process, the measured CER during the sampled periods is indicative of CER throughout the frame. Thirdly it depends only upon the reference station and not other stations. The samples (FRBs) are received by all stations but the measurements conducted at every station are independent. Thus, any station experiencing high CER will not affect other station's measurements.

DETERMINING NEGATIVE ACKNOWLEDGEMENT (NACK) THRESHOLDS

The NACK threshold is calculated based upon a constant probability rather than a fixed percentage. The number of XRBs received is dependent on the number of stations. If a fixed percentage is good for a large number of stations, it will not yield a satisfactory answer for a small number of stations.

If the reference station fails, reception of the FRB stops about 250 msec later. Negative FRB acknowledgements are then sent in the XRB thereafter. For the alternate station to assume the role of reference station, it must observe at least a certain number of negative acknowledgements (Y NACKS, the threshold).

For an N-station network, the probability (P) that the alternate station incorrectly reads (N−Y) XRBs can be expressed by the frequency function as $$P = \binom{N}{N-Y} P_{XRB}^{(N-Y)} (1 - P_{XRB})^N \qquad (5)$$

where $P_{XRB}$=probability of XRB decoding errors at CER=$10^{-2}$. Use of CER=$10^{-2}$ is justified because the XRBs are well protected at CER=$10^{-4}$. This provides an additional protection so that the baton pass will occur in case of CER measurement failure.

P is assumed to be $10^{-4}$. If P is too small, Y is large and the system is not very sensitive. Conversely, if P is too large, Y is small and the system (baton passing) is too sensitive. Thus P=$10^{-4}$ is a compromise figure.

The resultant NACK threshold requirements thus calculated are illustrated in Tables 1 and 2.

While the invention has been particularly shown and described with reference to the embodiment thereof, various changes in form and detail may be made therein without departing from the spirit and scope of the invention.

Having thus described our invention, what we claim as new, and desire to secure by Letters Patent is:

1. In a TDMA system having multiple stations and a frame format including one burst of transmitted data from each operating station in a non-overlapping sequence, each frame format including a frame reference burst from a primary reference station, a plurality of said frame formats being organized into a superframe, each station in said system transmitting one transmit reference burst during said superframe, the method for preventing failure of the system synchronization as the result of an impaired transmission of said frame reference burst, comprising the steps of:

monitoring at each of said multiple stations said frame reference burst from said primary reference station and transmitting a negative acknowledgment signal when it is not received;

monitoring at said primary reference station the number of said negative acknowledgment signals received and comparing it with a first threshold value;

monitoring at an alternate reference station said frame reference burst and the number of said negative acknowledgment signals received and comparing said number received at said alternate station with a second threshold value greater than said first value;

said transmit reference bursts being error correction encoded;

monitoring at said alternate reference station the channel error rate of said alternate station's transmit reference burst received thereat and comparing it with a third threshold value;

ceasing at said alternate reference station said transmission of said alternate station's transmit reference bursts when said channel error rate exceeds said third threshold value;

ceasing at said primary reference station said transmission of said frame reference bursts when said number of negative acknowledgment signals received thereat exceeds said first threshold value;

commencing at said alternate reference station the transmission of an alternate frame reference burst when said number of negative acknowledgment signals received thereat increases in response to said ceasing at said primary station so as to exceed said second threshold value and when no frame reference burst is received thereat from said primary station.

2. The method of claim 1, which further comprises the steps of:

monitoring at said primary reference station said relinquishing signal from said alternate station;

transmitting from said primary station an activation signal to a second one of said multiple stations in response to receiving said relinquishing signal;

activating at said second one of said multiple stations the status as an alternate reference station.

3. In a TDMA system having multiple stations and a frame format including one burst of transmitted data from each operating station in a nonoverlapping sequence, each frame format including a frame reference burst from a primary reference station, a plurality of said frame formats being organized into a superframe, each station in said system transmitting one transmit reference burst during said superframe, each frame reference burst being error correction coded, the method for preventing failure of the system synchronization as the result of an impaired transmission of said frame reference burst, comprising the steps of:
monitoring at each of said multiple stations said frame reference burst from said primary reference station and transmitting a negative acknowledgement signal when it is not received;
monitoring at said primary reference station the channel error rate of said frame reference burst received thereat and comparing it with a first threshold value;
monitoring at an alternate reference station said frame reference burst and the number of said negative acknowledgement signals received and comparing said number received at said alternate station with a second threshold value;
ceasing at said primary reference station said transmission of said frame reference bursts when said channel error rate exceeds said first threshold value;
commencing at said alternate reference station the transmission of an alternate frame reference burst when said number of negative acknowledgement signals received thereat increases in response to said ceasing at said primary station so as to exceed said second threshold value and when no frame reference burst is received thereat from said primary station.

4. The method of claim 3, prior to said ceasing step, comprising the steps of:
monitoring at each of said multiple stations said transmit reference burst from said alternate reference station and transmitting an alternate negative acknowledgement signal when said alternate station's transmit reference burst is not received;
monitoring at said alternate reference station the number of said alternate negative acknowledgement signals received and comparing it with a third threshold value;
transmitting from said alternate reference station a signal that it is relinquishing its alternate reference status when said number of alternate negative acknowledgement signals received thereat exceeds said third threshold value.

5. The method of claim 4, which further comprises the steps of:
monitoring at said primary reference station said relinquishing signal from said alternate station;
transmitting from said primary station an activation signal to a second one of said multiple stations in response to receiving said relinquishing signal;
activating at said second one of said multiple stations the status as an alternate reference station.

6. The method of claim 3, prior to said ceasing step, comprising the steps of:
said transmit reference bursts being error correction encoded;
monitoring at said alternate reference station the channel error rate of said alternate station's transmit reference burst received thereat and comparing it with a third threshold value;
ceasing at said alternate reference station said transmission of said alternate station's transmit reference bursts when said channel error rate exceeds said third threshold value.

7. The method of claim 6, which further comprises the steps of: p1 monitoring at said primary reference station said relinquishing signal from said alternate station;
transmitting from said primary station an activation signal to a second one of said multiple stations in response to receiving said relinquishing signal;
activating at said second one of said multiple stations the status as an alternate reference station.

8. The method of claim 3, which further comprises the steps of:
monitoring at said alternate reference station the channel error rate of said frame reference burst received thereat and comparing it with a third threshold value;
transmitting from said alternate reference station a signal that it is relinquishing its alternate reference status when said monitored channel error rate at said alternate station exceeds said third threshold value.

9. The method of claim 8, which further comprises the steps of:
monitoring at said primary reference station said relinquishing signal from said alternate station;
transmitting from said primary station an activation signal to a second one of said multiple stations in response to receiving said relinquishing signal;
activating at said second one of said multiple stations the status as an alternate reference station.

10. In a TDMA system having multiple stations and a frame format including one burst of transmitted data from each operating station in a nonoverlapping sequence, each frame format including a frame reference burst from a primary reference station, a plurality of said frame formats being organized into a superframe, each station in said system transmitting one transmit reference burst during said superframe, each frame reference burst being error correction coded, the method for providing an alternate reference station having a sufficiently good operating condition to enable its substitution for said primary reference station, comprising the steps of:
monitoring at a first alternate reference station the channel error rate of said frame reference burst received thereat and comparing it with a first threshold value;
transmitting from said alternate reference station a signal that it is relinquishing its alternate reference status when said monitored channel error rate at said first alternate station exceeds said first threshold;
monitoring at said primary reference station said relinquishing signal from said first alternate station;
transmitting from said primary station an activation signal to a second one of said multiple stations in response to receiving said relinquishing signal;
activating at said second one of said multiple stations the status as an alternate reference station.

11. The method of claim 10, wherein said step of transmitting said relinquishing signal further comprises:

modifying the transmit reference burst from said first alternate station to signify said relinquishment of alternate reference status.

12. The method of claim 10, which further comprises the steps of:

monitoring at each of said multiple stations said frame reference burst from said primary reference station and transmitting a primary negative acknowledgment signal when it is not received;

monitoring at said primary reference station the channel error rate of said frame reference burst received thereat and comparing it with a second threshold value;

monitoring at an alternate reference station said frame reference burst and the number of said primary negative acknowledgment signals received and comparing said number received at said alternate station with a third threshold value;

ceasing at said primary reference station said transmission of said frame reference bursts when said channel error rate exceeds said second threshold value;

commencing at said alternate reference station the transmission of an alternate frame reference burst when said number of primary negative acknowledgment signals received thereat increases in response to said ceasing at said primary station so as to exceed said third threshold value and when no frame reference burst is received thereat from said primary station.

13. The method of claim 12, wherein said step of transmitting said relinquishing signal further comprises:

modifying the transmit reference burst from an alternate reference station to signify said relinquishment of alternate status; and said step of transmitting primary negative acknowledgment signals further comprises:

modifying the transmit reference bursts from ones of said multiple stations to signify that said frame reference burst has not been received.

14. In a TDMA system having multiple stations and a frame format including one burst of transmitted data from each operating station in a nonoverlapping sequence, each frame format including a frame reference burst from a primary reference station, a plurality of said frame formats being organized into a superframe, each station in said system transmitting one transmit reference burst during said superframe, each frame reference burst being error correction coded, the method for providing an alternate reference station having a sufficiently good operating condition to enable its substitution for said primary reference station, comprising the steps of:

monitoring at a first alternate reference station the channel error rate of said frame reference burst received thereat and comparing it with a first threshold value;

transmitting from said alternate reference station a signal that it is relinquishing its alternate reference status when said monitored channel error rate at said first alternate station exceeds said first threshold;

monitoring at each of said multiple stations said transmit reference burst from said first alternate reference station and transmitting an alternate negative acknowledgment signal when said first alternate station's transmit reference burst is not received;

monitoring at said first alternate reference station the number of said alternate negative acknowledgment signals received and comparing it with a second threshold value;

transmitting from said first alternate reference station a signal that it is relinquishing its alternate reference status when said number of alternate negative acknowledgment signals received thereat exceeds said second threshold value;

monitoring at said primary reference station said relinquishing signal from said first alternate station;

transmitting from said primary station an activation signal to a second one of said multiple stations in response to receiving said relinquishing signal;

activating at said second one of said multiple stations the status as an alternate reference station.

15. The method of claim 14, wherein said step of transmitting said relinquishing signal further comprises:

modifying the transmit reference burst from said first alternate station to signify said relinquishment of alternate reference status.

16. The method of claim 14, which further comprises the steps of:

monitoring at each of said multiple stations said frame reference burst from said primary reference station and transmitting a primary negative acknowledgment signal when it is not received.

monitoring at said primary reference station the channel error rate of said frame reference burst received thereat and comparing it with a third threshold value;

monitoring at an alternate reference station said frame reference burst and the number of said primary negative acknowledgment signals received and comparing said number received at said alternate station with a fourth threshold value;

ceasing at said primary reference station said transmission of said frame reference bursts when said channel error rate exceeds said third threshold value;

commencing at said alternate reference station the transmission of an alternate frame reference burst when said number of primary negative acknowledgment signals received thereat increases in response to said ceasing at said primary station so as to exceed said fourth threshold value and when no frame reference burst is received thereat from said primary station.

17. The method of claim 16, wherein said step of transmitting said relinquishing signal further comprises:

modifying the transmit reference burst from an alternate reference station to signify said relinquishment of alternate status; and said step of transmitting primary negative acknowledgment signals further comprises:

modifying the transmit reference bursts from ones of said multiple stations to signify that said frame reference burst has not been received.

18. In a TDMA system having multiple stations and a frame format including at least one burst of transmitted data from each of two or more of said operating stations in a nonoverlapping sequence, each frame format including a frame reference burst from a primary reference station, a plurality of said frame formats being organized into a superframe, each of said two or more operating stations in said system transmitting at least one transmit reference burst during said superframe, each frame reference burst being error correction coded, the method for preventing failure of the system synchronization as the result of an impaired transmission of said frame reference burst, comprising the steps of:

monitoring at each of said two or more operating stations said frame reference burst from said primary reference station and transmitting a negative acknowledgment signal when it is not received;

monitoring at said primary reference station the channel error rate of said frame reference burst received thereat and comparing it with a first threshold value;

monitoring at an alternate reference station said frame reference burst and the number of said negative acknowledgment signals received and comparing said number received at said alternate station with a second threshold value;

ceasing at said primary reference station said transmission of said frame reference bursts when said channel error rate exceeds said first threshold value;

commencing at said alternate reference station the transmission of an alternate frame reference burst when said number of negative acknowledgment signals received thereat increases in response to said ceasing at said primary station so as to exceed said second threshold value and when no frame reference burst is received thereat from said primary station.

* * * * *

UNITED STATES PATENT AND TRADEMARK OFFICE
CERTIFICATE OF CORRECTION

PATENT NO. : 4,397,018
DATED : August 2, 1983
INVENTOR(S) : John W. Fennel, Jr. et al.

It is certified that error appears in the above-identified patent and that said Letters Patent is hereby corrected as shown below:

Column 16, line 10 delete "pl."

Signed and Sealed this

Eighteenth Day of October 1983

[SEAL]

Attest:

GERALD J. MOSSINGHOFF

Attesting Officer

Commissioner of Patents and Trademarks